3,767,792
METHOD FOR CONTROLLING THE TOXICITY OF DRUG PRODUCTS
Elton S. Cook, Cincinnati, Ohio, and Leo G. Nutini, Burlington, Ky., assignors to Stanley Drug Products, Inc., Portland, Oreg.
No Drawing. Continuation-in-part of application Ser. No. 825,068, May 15, 1969, which is a continuation-in-part of application Ser. No. 530,413, Feb. 28, 1966, both now abandoned. This application July 2, 1971, Ser. No. 159,465
Int. Cl. A61k 27/00
U.S. Cl. 424—95      4 Claims

ABSTRACT OF THE DISCLOSURE

A substance and method for treating animal organisms wherein a non-topical drug preparation for internal use and a stimulating factor for cellular respiration are introduced into the bloodstream of the organism being treated.

CROSS REFERENCE TO RELATED APPLICATIONS

This application is a continuation-in-part of the copending application in the name of the same inventors, Ser. No. 825,068, filed May 15, 1969 and entitled Means and a Method for Controlling the Toxicity of Drug Products, now abandoned, which, in turn, is a continuation-in-part of the copending application in the name of the same inventors, Ser. No. 530,413, filed Feb. 28, 1966 and entitled Means and a Method for Controlling the Toxicity of Drug Products, now abandoned.

BACKGROUND OF THE INVENTION

(1) Field of the invention

The invention relates to means and a method for controlling the toxicity of drug products.

(2) Description of the prior art

In this specification the term "Toxic" will be used in a broad sense to cover ill effects or impairment of the body functions of an organism to which the drugs are administered. The term as used herein is not confined in its meaning to the death of the subject organism.

It is well known that many drugs and drug products, while having valuable effects upon the bodies of animals or human beings, produce at the same time more or less unrelated and unexpected side effects which may be of serious character. For example, nitrogen mustard (mustargen) is a widely employed chemotherapeutic agent in the clinical treatment of cancer. Yet its use must be carefully limited and frequently discontinued because of various side effects which include gastrointestinal disturbances, pain in various parts of the body, a breaking out of the skin and other apparently unrelated toxic effects. Again, a valuable wide-spectrum antibiotic substance known as kanamycin must be used with exceeding care and under conditions of strict limitation because deleterious effects upon the functioning of the ears and the kidneys apparently stem from the use of the drug. For purposes of an exemplary showing, other drugs capable of producing undesirable side effects are reserpine, chlortetracycline (aureomycin), acetylsalicylic acid (aspirin) and azathioprine (Imuran).

In such United States patents as Nos. 2,320,478 and 2,320,479, George S. Sperti taught the preparation of an agent which promoted respiration of animal cells. This agent is a material, organic in origin and complex in nature derived by extraction from yeast or from certain animal tissues such as brain, spleen and others. U.S. Pat. No. 2,239,345 taught the preparation of an agent which is effective in promoting the growth and proliferation of animal cells. Various preparations have been produced and sold containing a combination of these agents, and suitable for use as topical remedies for external lesions or irritation. Thus a composition containing these agents, in a suitable vehicle and in some instances containing a bactericide, have come into widespread use for the treatment of burns. Also other types of the same general class of compositions have come into use for the treatment of hemorrhoids, and again for use in cosmetics and the like. In connection with the manufacture and employment of such compositions it has been understood that the cellular respiration stimulating factor and the factor promoting cellular growth and proliferation tended to offset the effects of components of ointments, cosmetics and the like which had a natural effect in decreasing cellular respiration. In the present case one is not dealing directly with offsetting the effects of materials which depress cellular respiration. While the depression of cellular respiration can be regarded as a toxic effect of many substances when used in topical applications, and while a cessation of cellular respiration could be regarded as an incidental effect of the death of the organism receiving the topical applications, this application is directed to the use of non-topical drug substances for internal use. The drug preparations treated herein are of the type administered by injection or taken orally and ingested so as to become a part of the bloodstream of the animal organism under treatment. The term "animal organism" is used in its broad sense and includes human organism. The toxic effects (such as those mentioned above and described hereinafter) of the drug preparations are not directly or obviously connected with any aspect of cellular respiration.

Accordingly, the present invention provides means and a mode of treatment of living organisms such that the toxic effects of various drug products administered as set forth above are minimized or alleviated, the result being that the dosage of the drug may be increased or that the use of the drug may be substantially prolonged, or both. In the specification, and claims which follow, reference to the treatment of animal organisms with non-topical drug preparations will be understood to relate to treatment of those conditions for which the drug preparations are intended and normally used.

SUMMARY OF THE INVENTION

Briefly, the invention contemplates the treatment of an animal organism with a non-topical drug substance of the type having undesirable toxic effects and a cellular respiration stimulating factor whereby the toxic effects of the drug substance will be minimized or alleviated. The cellular respiration stimulating factor may be administered before, simultaneously with or after administration of the drug substance.

DESCRIPTION OF THE PREFERRED EMBODIMENTS

The present application is based on the discovery that a number of drug products having valuable effects when used in the bodies of animals and human beings, could be rendered less toxic by the use of a respiratory stimulating factor. This discovery is not directed to the avoidance of undesirable side effects of the drug products by a material which will produce offsetting side effects of opposite character. On the contrary, the invention embodies the remarkable discovery that the substances used to decrease the toxicity of drug products are effective for this purpose but do not at the same time produce a diminution of the desired therapeutic effects of the drug products themselves. Such therapeutic effects have actually been found to be enhanced in some experiments.

Substances which are advantageous in the promoting of cellular respiration are well known in the art. Such materials are organic in origin and complex in nature. The term "respiration stimulating factor," as used herein and in the claims which follow, refers to those cellular extracts taught in United States Letters Patent 2,320,478 and 2,320,479. These extracts are prepared, for example, by extracting plant or animal matter with 80 percent ethyl alcohol, filtering or centrifuging, and evaporating the filtrate (or centrifugate) under reduced pressure to remove the alcohol and to concentrate the extract to any desired degree. Variations may be made in the procedure. For example, ethyl alcohol denatured with methyl alcohol may be used. An initial extraction with water, followed by addition of alcohol to 80 percent, may be employed and is especially useful for animal tissue. Various purification procedures, such as further extraction with ether to remove fat, adsorption on charcoal, precipitation with acetone, etc., may be useful. Various vegetable and animal materials may serve as sources, such as yeast, malt combings, spleen and liver. Respiratory activity is determined by assay in Warburg respirometers and the activity is expressed in terms of respiratory units. Examples of sources, processes, and assay may be found in:

United States Letters Patent 2,320,478 and 2,320,479;
Cook, Kreke and Nutini, Studies Institutum Divi Thomae, 2, 23 (1938);
Cook and Kreke, ibid. 2, 173 (1939);
Cook and Walter, ibid. 2, 189 (1939);
Cook and Kreke, ibid. 2, 215 (1939);
Cook and Walter, ibid. 2, 239 (1939);
Cook and Walter, ibid. 3, 39 (1941);
Cook and Walter, ibid. 3, 139 (1941);
Cook, Walter, Rack, Eilert, and Sawyer, ibid. 3, 147 (1941);
Ruddy, Arch. exp. Zellforsch, 22, 599 (1939); and
Cook and Kreke, Acta Unio intern. contra Cancrum, 7, 545 (1951).

It is possible in accordance with the principles of this invention to simultaneously administer a drug product desired for treatment and a respiration stimulating factor which diminishes the toxicity of the drug product. It is further possible to mix the two prior to administration. On the other hand, it is possible to administer the respiration stimulating factor first to an animal or human organism, and then thereafter administer the drug product having the undesired side effects. The result of such a mode of treatment will be a diminution or amelioration of the undesired side effects of the drug product. By the same token, it is possible to administer the drug product first and thereafter the respiration stimulating factor with a diminution or amelioration of the undesired side effects of the drug preparation. This appears to indicate that the toxic effects of the drug preparations are controlled by the respiration stimulating factor. No basis has as yet been discovered for an assumption that the respiration stimulating factor and the drug product interact or come into chemical union with each other. The mechanism of action of these two substances is not as yet fully understood.

Nevertheless, the use of the two essential ingredients, i.e. a respiration stimulating factor and a drug product produces remarkable and unexpected results over a widespectrum of drug products of chemically unrelated characters.

The respiration stimulating factor can be produced in liquid form or in the form of a solid, and in either of these forms can be mixed with a drug product having undesired side effects referred to by the term toxicity herein.

Experiments have shown that the respiration stimulating factor very greatly reduces the toxicity of reserpine, which is a hypotensive agent. A variety of undesirable side effects may be caused by this drug including the possibility of acute cardiovascular collapse following sudden stress.

EXAMPLE I

The following is a typical experiment to determine the effect of the respiration stimulating factor on the toxicity of reserpine.

Procedure: Two groups of five mice each were used. Group I received 20 mg. of reserpine suspended in water, orally. Group II received a mixture of 20 mg. of reserpine and 2000 respiratory units of the respiration stimulating factor, orally.

Results: Both groups showed signs of reserpine activity; inactivity, diminished appetite, puffy eyes, ruffled coat, and weight loss. Mortality was as follows:

| Time of death, hours | Percent mortality | |
|---|---|---|
| | Group I | Group II |
| 96 | 20 | 0 |
| 108 | 80 | 20 |
| 142 | 80 | 20 |
| 168 | 80 | 40 |
| 192 | 80 | 80 |

Conclusions: The respiration stimulating factor showed effectiveness in offsetting the toxicity of reserpine by prolonging survival time.

Kanamycin is an excellent broad-spectrum antibotic but of high toxicity. This drug, in sufficient dosages, may cause death. The non-fatal toxic manifestations include hearing loss as a result of injury to the auditory portion of the eighth cranial nerve, and kidney damage.

EXAMPLE II

The following indicates the ability of the respiration stimulating factor to offset the toxicity of kanamycin.

Procedure: Group I, a control group of five mice, received 0.4 ml. (100 mg.) kanamycin plus 0.28 ml. water mixed together with a total volume of 0.68 ml. Group II, an experimental group of five mice, received 0.4 ml. (100 mg.) kanamycin plus 0.28 ml. of the respiration stimulating factor (2000 respiratory units) mixed together giving a total volume of 0.68 ml. The mice were male and twenty-two weeks of age. Both groups of mice were inoculated subcutaneously.

WEIGHTS OF MICE IN GRAMS

Group I—Control

Mouse No.:
1 _____ 39.4
2 _____ 35.6
3 _____ 33.3
4 _____ 38.0
5 _____ 35.6

Group II—Experimental

Mouse No.:
1 ------ 35.3
2 ------ 36.4
3 ------ 35.9
4 ------ 37.8
5 ------ 39.0

Results: Kanamycin caused kidney malfunction, inactivity, puffing around the eyes, a ruffled coat, and death. In the experimental group which received the respiration stimulating factor, the symptoms lasted only one hour. The mortality rate and survival rate were as follows:

Group I—Control—100% in thirty minutes
Group II—Experimental—
20% in forty minutes
80% of the mice survived Conclusions: This demonstrates that the respiration stimulating factor causes recovery from the toxic symptoms resulting from kanamycin and is highly effective in lowering mortality.

EXAMPLE III

The following experiment illustrates the ability of the respiration stimulating factor to offset the toxicity of kanamycin when the respiration stimulating factor is administered prior to the drug.

Procedure: The respiration stimulating factor (2000 respiratory units in 0.28 ml.) was inoculated subcutaneously one hour prior to inoculation of kanamycin. Three groups of ten mice per group were used. The mice were Swiss female, fifteen weeks of age with an average weight of 23 grams. Group I constituted the control group. Group II constituted the kanamycin control group. These mice received 50 mg. of kanamycin subcutaneously five hours prior to challenge with *Salmonella typhi*. Group III constituted the group receiving kanamycin and the respiration stimulating factor. Two thousand respiratory units in 0.28 ml. of the respiration stimulating factor was inoculated subcutaneously one hour prior to inoculation of 50 mg. of kanamycin. Challenge was then made with *Salmonella typhi* five hours later. All animals were challenged with 0.2 ml. of a 97% transmission suspension of *Salmonella typhi*.

Results:

| | Percent mortality before challenge with salmonella | | | | |
|---|---|---|---|---|---|
| Hours | 1 | 2 | 3 | 4 | 5 |
| Group II | 60 | 60 | 60 | 60 | 60 |
| Group III | 10 | 20 | 20 | 20 | 20 |

| | Percent mortality after challenge with salmonella | | | |
|---|---|---|---|---|
| Hours | 24 | 28 | 72 | 96 |
| Group I, 10 mice | 90 | 90 | 90 | 90 |
| Group II, 4 mice | 0 | 0 | 0 | 0 |
| Group III, 8 mice | 0 | 0 | 0 | 0 |

Conclusions: The toxicity of kanamycin was greatly lowered by the respiration stimulating factor as shown by the results before challenge. The antibiotic efficacy of kanamycin was unimpaired as shown by the results after challenge.

EXAMPLE IV

The following shows the effect of the respiration stimulating factor on the antibacterial activity of kanamycin when added with this drug.

Procedure: Four plates were prepared with SA 110 medium. The plates were swabbed with *Staphylococcus aureus* strain H-14. A sensi-disc of kanamycin, 30 mcg., was placed on each plate. On the two control plates a volume of 0.03 ml. of distilled water was deposited on each disc by means of a syringe. On the two experimental plates a volume of 0.03 ml. of the respiration stimulating factor or 212 respiratory units was deposited on each disc by means of a syringe. All four plates were incubated for forty-eight hours at 37° C.

Results:

ZONE OF INHIBITION

Cm. diameter
Control plate I ------ 1.05
Plate II ------ [1] 1.2
Experimental plate I ------ 1.29
Plate II ------ [2] 1.1

[1] A few scattered colonies were observed within the inhibition zone.
[2] Zones very clear, no growth at all.

Conclusions: The respiration stimulating factor does not decrease the anti-bacterial activity of kanamycin for *Staphylococcus aureus* but appears to enhance it.

Nitrogen mustard or mustargen (mechlorethamine hydrochloride) is a compound which is cytotoxic and is especially active against rapidly proliferating cells, including normal as well as neoplastic cells. This activity against certain normal as well as cancer cells is one cause of toxicity. When combined with the respiration stimulating factor, its selectivity for cancer cells is increased rendering it more effective and less toxic.

EXAMPLE V

The following illustrates the ability of the respiration stimulating factor to offset the toxicity of nitrogen mustard.

Procedure: The experiment included two groups of five mice each. Group I, the control group, received an I.P. injection of 0.5 mg. nitrogen mustard in 0.25 ml. Tyrode solution plus water to make a total volume of 0.53 ml. Group II, the experimental group, received an I.P. injection of 0.5 mg. nitrogen mustard in 0.25 ml. Tyrode solution plus 0.28 ml. respiration stimulating factor (2000 respiratory units). The total volume was 0.53 ml.

Results: Nitrogen mustard toxicity caused puffiness around the eyes and ruffled the coat.

MORTALITY RATE

| Time, hours | Group I control, percent | Group II experimental, percent |
|---|---|---|
| 29 | 20 | 0 |
| 40 | 40 | 0 |
| 72 | 60 | 0 |
| 96 | 100 | 0 |
| 113 | | 60 |
| 121 | | 100 |

WEIGHT OF THE MICE IN GRAMS

Group I.—Control

Mouse No.:
1 ------ 36.3
2 ------ 37.7
3 ------ 33.8
4 ------ 34.4
5 ------ 35.9

Group II.—Experimental

Mouse No.:
1 ------ 34.3
2 ------ 36.8
3 ------ 36.8
4 ------ 36.4
5 ------ 30.0

Conclusions: The respiration stimulating factor has a definite effect, causing a delay of the effects of nitrogen mustard toxicity and prolonging the life of the mice.

EXAMPLE VI

The experiment below illustrates the effect of the respiration stimulating factor on the toxicity of nitrogen nitrogen mustard when hte factor is administered prophylactically.

Procedure: Two groups of five mice each were used. Group I, the control group, received an I.P. injection of 0.28 ml. saline six hours prior to the I.P. injection of 0.5 mg. of nitrogen mustard in 0.25 ml. Tyrode solution. Group II, the experimental group, received an I.P. inoculation of 2000 respiratory units of the respiration stimulating factor (0.28 ml.) six hours prior to an I.P. inoculation of nitrogen mustard (0.5 mg./0.25 ml.). The mice were male and twenty-two weeks of age.

WEIGHT OF THE MICE IN GRAMS

Group I.—Control

Mouse No.:
1 ------------------------------------ 30.0
2 ------------------------------------ 30.1
3 ------------------------------------ 33.7
4 ------------------------------------ 30.0
5 ------------------------------------ 28.5

Group II.—Experimental

Mouse No.:
1 ------------------------------------ 38.4
2 ------------------------------------ 36.1
3 ------------------------------------ 35.8
4 ------------------------------------ 36.3
5 ------------------------------------ 37.9 mustard when the factor is administered prophylactically.

Results: The effect of nitrogen mustard (visible) was as previously described in Example V.

MORTALITY RATE

| Time, hours | Group I control, percent | Group II experimental, percent |
|---|---|---|
| 35 | 20 | 0 |
| 66 | 40 | 0 |
| 70 | 60 | 20 |
| 92 | 100 | 80 |
| 124 | | 100 |

Conclusion: The respiration stimulating factor has a definite effect on nitrogen mustard toxicity. The respiration stimulating factor, when administered I.P. prophylactically, has the ability to prolong the life of animals receiving nitrogen mustard.

EXAMPLE VII

The following experiment shows the effects of nitrogen mustard alone and in combination with the respiration stimulating factor on tumor growth.

Procedure: Fifteen mice received a subcutaneous inoculation of sarcomas 37. Thirteen days later the mice were divided into three groups: Group I was the untreated control group; Group II was given a single dose of 0.25 mg. of nitrogen mustard subcutaneously. Group III received a single injection of the same amount of nitrogen mustard plus 2000 respiratory units of the respiration stimulating factor. The groups were followed for tumor size and mortality.

Results:

Group I

Twenty percent mortality in seventeen days; 40% mortality in twenty-nine days; 60% mortality in forty-seven days; 80% mortality in forty-nine days; 100% mortality in fifty-five days.

Group II

No mortality until twenty-nine days when 60% of the animals died; 80% mortality in thirty-one days; 100% mortality in fifty-seven days. Tumors smaller than control.

Group III

No mortality until forty-nine days when 40% of the mice died; 60% mortality in fifty-five days; 80% mortality in sixty-one days; 100% mortality in sixty-three days. Tumors smaller than control and similar to Group II.

Conclusions: Nitrogen mustard alone somewhat delayed death but showed its effect chiefly in the smaller size of the tumor. The combination of nitrogen mustard and the respiration stimulating factor was definitely more effective in delaying death and was similar to nitrogen mustard alone in diminishing the size of the tumor.

Chlortetracyline or aureomycin is a broad-spectrum antibiotic of the bacteriostatic type. This drug may cause a number of undesirable side effects such as those attributable to mucous membrane involvement.

EXAMPLE VIII

This example illustrates the effect of the respiration stimulating factor on the anti-bacterial properties of aureomycin when added to an aureomycin sensi-disc.

Procedure: Four plates where prepared with SA-110 culture medium and swabbed with *Staphyloccoccus aureus*. An aureomycin sensi-disc was placed on each plate. On two plates (control plates) a volume of 0.05 ml. of distilled water was deposited on each disc by means of a syringe. On the other two plates (experimental plates) a volume of 0.05 ml. of the respiration stimulating factor (353 respiratory units) was deposited on each disc.

Results: After forty-two hours incubation at 37.5° C. the following observations were made:

Zone of inhibition, cm. in diameter

Control plates:
Plate I ------------------------------ 2.8
Plate II ----------------------------- 3.0
Experimental plates:
Plate I ------------------------------ 3.5
Plate II ----------------------------- 3.0

Conclusions: The respiration stimulating factor does not decrease the anti-bacterial activity of aureomycin (chlortetracyline) but rather increases it.

Aspirin, or acetylsalicylic acid, is widely used as an analgesic for the relief of pain. Large continued doses of aspirin may produce symptoms of salicylism including ringing in the ears, mental confusion, sweating and gastrointestinal distress. In children large doses have been fatal.

EXAMPLE IX

The following illustrates the ability of the respiration stimulating factor to offset the toxicity of acetylsalicylic acid.

Procedure: There were two groups of five mice each. Group I, the control group, received 50 mg. of aspirin plus water. Group II the experimental group, received 50 mg. of aspirin plus 2000 respiratory units of the respiration stimulating factor or 0.28 ml. plus water. The final volume was 1.0 ml. The 2000 respiratory units of the factor were inoculated subcutaneously ten to fifteen minutes prior to the oral administration of 50 mg. of aspirin.

Results: Acetylsalicylic acid poisoning caused slight inactivity followed by severe convulsions and death in the mice. The mortality variations were as follows:

Group I—Control: 50 mg. aspirin plus water
  80% in one hour
  100% in 1½ hours.
Group II—Experimental: respiration stimulating factor (2000 respiratory units) plus 50 mg. aspirin
  40% in one hour
  60% in 1½ hours
  40% survived Conclusions: The respiration stimulating factor showed a significant effect on the toxicity of acetylsalicylic acid.

EXAMPLE X

The following illustrates the ability of the respiration stimulating factor to offset the toxicity of azathioprine.

The principal toxic effect of azathioprine is bone marrow depression.

Procedure: Fasting, conditioned mongrel dogs under nembutal anesthesia (30 mgm./kg.), with endotracheal intubation on a Harvard respirator using room air with sterile operative techniques, underwent bilateral nephrectomy. A single kidney was then exchanged between donor and recipient with an end-to-side anastomosis of the renal artery and vein to the lower aorta and inferior vena cava. All kidneys were gently irrigated with 150–300 ml. dilute heparinized saline. An average of 400 ml. Ringer's lactate was given iv. during the first postoperative day to replace measured and estimated blood and fluid losses. Animals were placed in metabolic cages to facilitate measurement of 24 hours urinary output, and estimation of endogenous creatinine clearances.

Before and after operation periodic blood specimens were obtained. Hematological tests performed included hematocrit (vols. percent), total white cell count (WBC), and total lymphocyte count. Serial chemical tests included blood urea nitrogen (mgm. percent) and serum creatinine (mgm. percent). Postoperatively 24 hour urine output was recorded, and endogenous creatinine clearances calculated. In selected animals periodic bone marrow aspirates were obtained, and also studied.

The experimental groups were as follows:

(1) No treatment
(2) Treated with respiration stimulating factor only (50 mgm./kg./im./Q.O.D.)
(3) Treated with azathioprine only (5 mgm./kg./im.)
(4) Treated with azathioprine (5 mgm./kg./im./qd.) and respiration stimulating factor (50 mgm./kg./im./Q.O.D.)

Parenteral lyophilized azathioprine (Imuran) was given on a body weight basis. Respiration stimulating factor, made from baker's yeast as described above, was also administered on a body weight basis.

At death all animals underwent a gross autopsy. Any evidence of technical failure or other systemic causes of death excluded the animal from the study. Failures included: Thrombosis of the arterial or venous anastomosis (technical), or intestinal intussusception (systemic). Animals with any evidence of gross wound or peritoneal infection or suppuration were also excluded from this series. Since distemper can be a serious problem during the winter months in this area's canine mongrel pound population, no animal was used who had rhinorrhea or preoperative fever (temp. >101°) as verified by rectal temperatures. Acceptable animals at autopsy were without grossly evident pneumonic infiltrates, or atelectasis. Selected tissues were fixed in 10% neutral formalin stained with hematoxylin and eosin, and examined by light microscopy.

Results:

TABLE I.—SURVIVAL TIME OF TREATED AND UNTREATED DOG RENAL ALLOGRAFTS

| Group | Number animals | Days mean ($\pm$S.E.) survival |
|---|---|---|
| Untreated | 12 | 9.25$\pm$0.17 |
| Azathioprine (5 mgm./kg./Qd./im.) | 15 | 14.6$\pm$0.67 |
| Azathioprine and respiration stimulating factor (5 mgm./kg./Qd./im.) (50 mgm./kg./Q.O.D./im.) | 17 | 22.6$\pm$1.38 |
| Respiration stimulating factor (50 mgm./kg./Q.O.D./im.) | 21 | 9.21$\pm$0.17 |
| Total | 65 | |

Table I summarizes the average survival times noted in 65 dog renal allograft recipients. Untreated dogs survive 9.25$\pm$0.17 days ($\bar{x}\pm$S.E.) before death from uremia and renal rejection ensue. Respiration stimulating factor (50 mgm./kg.) treated animals did not survive for a significantly longer period (9.21$\pm$0.17). Animals treated with the conventional dosage of azathioprine (Imuran) at 5 mgm./kg. survived 14.6$\pm$0.67 days (p<.05). Combination of azathioprine (5 mgm./kg.) with the respiration stimulating factor (50 mgm./kg.) significantly prolonged survival to 22.6$\pm$1.38 days (p<.01) before uremic death occurred.

TABLE II.—AVERAGE POSTOPERATIVE TOTAL LYMPHOCYTE COUNTS

| Group | $\bar{x}\pm1$ S.D. | |
|---|---|---|
| Untreated | 4,335 | 289 |
| Azathioprine (5 mgm./kg.) | 3,326 | 29 |
| Azathioprine (5 mgm./kg.) and respiration stimulating factor | 2,742 | 38 |
| Respiration stimulating factor | 4,593 | 116 |

Postoperative total lymphocyte counts in renal allografted animals correlated with the apparent degree of immunosuppression achieved in the treated and untreated animals. These average values are noted in Table II. As shown, the respiration stimulating factor itself does not significantly reduce total lymphocyte levels postoperatively. Generally progressive levels of depression were hover noted in azathioprine, and azathioprine plus respiration stimulating factor treated animals.

TABLE III.—FUNCTIONAL DATA IN UNTREATED DOG RENAL ALLOGRAFTS [1]

| | Hematocrit (vols. percent) | Total white cell count | Total lymphocyte cyte count | Blood urea nitrogen (mgm. percent) | Average 24 hr. urine vol. (m.l.) postoperative | Creatinine clearance (ml./mm.) postoperative | Number of dogs alive |
|---|---|---|---|---|---|---|---|
| Preoperative | 37.7$\pm$1.5 | 6,111$\pm$323 | 1,992$\pm$242 | 14.7$\pm$0.9 | | | 12/12 |
| 1–4 | 35.7$\pm$0.9 | 16,460$\pm$1,616 | 4,127$\pm$163 | 42$\pm$1.6 | 318$\pm$28 | 6.2$\pm$.02 | 12/12 |
| 5–7 | 32.4$\pm$1.5 | 14,349$\pm$442 | 4,260$\pm$388 | 128$\pm$9.1 | 420$\pm$37 | 6.6$\pm$0 | 10/12 |
| 8–10 | 34.9$\pm$2.3 | 16,187$\pm$633 | 4,260$\pm$360 | 235$\pm$15.8 | 410$\pm$53 | | 4/12 |
| 11–14 | | | | | | | 0/12 |

[1] Values are mean$\pm$1 S.D.

Table III records the pre- and postoperative data noted in 12 untreated dog renal allografts. A postoperative rise in blood-urea-nitrogen, and total lymphocyte counts were observed. Leucocytosis was also noted.

TABLE IV.—FUNCTIONAL DATA IN RESPIRATION STIMULATING FACTOR [1] TREATED DOG RENAL ALLOGRAFTS [2]

| | Hematocrit (vols. percent) | Total white cell count | Total lymphocyte cyte count | Blood urea nitrogen (mgm. percent) | Average 24 hr. urine vol. (m.l.) postoperative | Creatinine clearance (ml./mm. postoperative | Number of dogs alive |
|---|---|---|---|---|---|---|---|
| Preoperative | 37.1$\pm$0.9 | 7,874$\pm$170 | 1,963$\pm$45 | 12.8$\pm$1.0 | | | 21/21 |
| 1–4 | 36.7$\pm$0.9 | 19,287$\pm$200 | 4,152$\pm$56 | 88.4$\pm$13.9 | 338$\pm$27 | 8.1$\pm$0.6 | 21/21 |
| 5–7 | 30.7$\pm$1.3 | 13,163$\pm$176 | 2,650$\pm$48 | 124.5$\pm$18.2 | 305$\pm$28 | 3.6$\pm$0.5 | 19/21 |
| 8–10 | 28.6$\pm$1.7 | 18,754$\pm$1,545 | 5,810$\pm$791 | 298$\pm$41.2 | 415$\pm$51 | 1.8$\pm$0 | 10/21 |
| 11–14 | 34.0$\pm$0 | 7,327 | 2,125$\pm$0 | 36$\pm$0 | 373$\pm$74 | | 2/21 |
| 15–21 | 31.5$\pm$3.5 | 7,232$\pm$460 | 1,744$\pm$678 | 127.5$\pm$38.7 | 146$\pm$24 | | 1/21 |
| 22–28 | | | | | 100$\pm$0 | | 1/21 |

[1] 50 mgm./kg./Q.O.D./i.m.
[2] Values $\bar{x}\pm1$ S.D.

In contrast to Table III, Table IV shows that respiration stimulating factor treated animals generally survived a few days longer. The levels of blood-urea-nitrogen at comparable postoperative periods were similar. Total lymphocyte counts in respiration stimulating factor treated animals showed more variation than in untreated animals with low levels being noted in the few animals who survived beyond 10 days postoperatively. Anemia was not observed.

apparent. Microscopically focal areas of lymphatic and peritubular plasma cellular infiltrates are also noted. Ar-

TABLE V.—FUNCTIONAL DATA IN AZATHIOPRINE[1] TREATED DOG RENAL ALLOGRAFTS[2]

|  | Hematocrit (vols. percent) | Total white cell count | Total lymphocyte count | Blood urea nitrogen (mgm. percent) | Average 24 hr. urine vol. (m.l.) postoperative | Creatinine clearance (ml./mm.) postoperative | Number of dogs alive |
|---|---|---|---|---|---|---|---|
| Preoperative | 39.5±0.3 | 5,698±165 | 2,399±130 | 15.7±0.5 |  |  | 15/15 |
| Days postoperative: |  |  |  |  |  |  |  |
| 1-4 | 39.2±0.3 | 15,655±199 | 3,917±116 | 74.1±1.8 | 388±5.8 | 6.10±0.4 | 15/15 |
| 5-7 | 38.5±0.4 | 12,306±212 | 2,891±73 | 114.1±4.4 | 433±9 | 6.2±1.4 | 15/15 |
| 8-10 | 34.6±.6 | 11,668±516 | 2,906±157 | 178.2±12.3 | 289±10 | 6.7±0.20 | 9/15 |
| 11-14 | 36.1±0.7 | 10,196±516 | 2,090±92 | 241±14.3 | 329±10 | 3.3±0.9 | 9/15 |
| 15-21 | 33.7±1.2 | 8,735±1,036 | 1,943±250 | 213±32.2 | 423±15 | 1.6±0.4 | 5/15 |
| 22-28 | 25.7±0.5 | 15,263±1,271 | 6,627±448 | 29.3±1.9 | 324±31 |  | 2/15 |
| 29-35 | 24.5±0.4 | 15,237±1,769 | 8,204±848 | 27.8±3.2 | 254±15 | 14.8±0 | 1/15 |
| 36-42 | 20±0 | 13,780±0 | 6,752±0 | 22±0 | 288±15 | 18.0±0 | 1/15 |
| 43-49 | 18±0 | 9,539±0 | 1,145±0 | 22±0 | 275±18 | 16.0±0 | 1/15 |

[1] 5 mgm./kg./im/qd.
[2] Values $\bar{x}$ ±1 S.D.

Table V summarizes some of the data obtained in dog renal allografts treated with the conventional dosage of azathioprine (5 mgm./kg./im/q.d.). These animals survived for generally longer periods of time. Up to 22 days postoperatively sustained lower levels (<3000) of total lymphocytes were observed. Anemia (Hct <25) was not evident until 36 days postoperatively in one survivor who was not azotemic. Compared to the previous groups renal function as judged by level of blood-urea-nitrogen and creatinine clearance was slightly better.

teriolar obliteration, endothelial proliferation, and necrosis of the vascular wall are also evident. Respiration stimulating factor treated animals exhibited no marked differences from untreated allografted animals. Azathioprine treated, and azathioprine plus respiration stimulating factor treated animals had less degree of gross congestion and swelling, diminished interstitial hemorrhage, cellular infiltrates, and vascular damage. Some focal fibrosis and scarring with tubular atrophy was evident in all specimens.

TABLE VI.—FUNCTIONAL DATA IN AZATHIOPRINE[1] AND RESPIRATION STIMULATING FACTOR[2] TREATED DOG RENAL ALLOGRAFTS[3]

|  | Hematocrit (vols. percent) | Total white cell count | Total lymphocyte count | Blood urea nitrogen (mgm. percent) | Average 24 hr. urine vol. (m.l.) postoperative | Creatinine clearance (ml./mm.) postoperative | Number of dogs alive |
|---|---|---|---|---|---|---|---|
| Preoperative | 39.0±0.3 | 6,368±120 | 1,901±51 | 14.4±0.3 |  |  | 17/17 |
| Days postoperative: |  |  |  |  |  |  |  |
| 1-4 | 40.1±0.3 | 17,802±218 | 4,891±189 | 96.7±3 | 503±5 | 6.25±0.6 | 17/17 |
| 5-7 | 37.0±0.2 | 10,348±142 | 2,295±42 | 73.6±1.9 | 523±6 | 12.2±0.60 | 13/17 |
| 8-10 | 36.1±0.5 | 8,846±250 | 2,210±75 | 137.8±11.2 | 416±9 | 8.5±1.4 | 13/17 |
| 11-14 | 38.1±0.5 | 7,769±221 | 1,840±36 | 94.5±7.9 | 365±40 | 10.75±1.4 | 7/17 |
| 15-21 | 34.5±0.6 | 7,547±337 | 1,435±43 | 31.8±2.7 | 378±41 | 10.73±1.2 | 6/17 |
| 22-28 | 31.6±0.5 | 8,658±299 | 2,011±60 | 34.2±1.1 | 403±11 | 11.6±0.9 | 3/17 |
| 29-35 | 27.2±0.40 | 9,250±249 | 2,170±85 | 91.2±14.5 | 428±18 | 11.5±2.0 | 3/17 |
| 36-42 | 30±1.3 | 9,545±381 | 2,006±116 | 82±13.4 | 532±15 | 7.8±0.9 | 3/17 |
| 43-49 | 28.9±2.3 | 5,476±542 | 1,493±153 | 165.8±37 | 467±26 | 4.8±1.0 | 3/17 |
| 50-56 | 26.5±1.1 | 3,383±393 | 1,181±196 | 44.5±1.1 | 745±52 | 10.1±0.3 | 1/17 |
| 57-63 | 30±0.7 | 6,170±421 | 1,592±22 | 51.5±3.9 | 380±70 | 7.7±3.7 | 1/17 |
| 64-70 | 29±0 | 11,184±1,868 | 1,726±48.6 | 82±11.4 | 617±49 | 3±1.4 | 1/17 |
| 71-77 | 33±2.8 | 6,723±1,013 | 1,141±58 | 125±0 | 483±24 | 4.8±0.8 | 1/17 |
| 78-84 | 28.5±0.40 | 9,144±736 | 2,296±248 | 67.5±8.9 | 240±0 | 5.6±1.6 | 1/17 |
| 85-91 | 32±0 | 6,961±66 | 1,774±58 |  | 780±35 | 4.6±1.8 | 1/17 |
| 92-98 | 31±0 | 6,195±651 | 2,272±248 |  | 648±39 | 4.2±2.3 | 1/17 |

[1] 5 mgm./kg./im./qd.
[2] 50 mgm./kg./im./Q.O.D.
[3] All values=$\bar{x}$±1 S.D.

Table VI compiles in graphic fashion the data noted in azathioprine (5 mgm./kg.) and respiration stimulating factor (50 mgm./kg.) treated allografts. One animal lived beyond the experiment. The increased survival times correlate with low total lymphocyte counts, absence of anemia, and better level of renal function as judged by urinary output and creatinine clearance. After the tenth postoperative day blood-urea-nitrogen levels in surviving animals remained low until the 30th postallograft day.

EXAMPLE XI

Toxicity studies

Two long surviving dog renal autografts (>5 months) were given respiration stimulating factor (50 mgm./kg./day) or azathioprine (5 mgm./kg./day/im) without any change in measured level of renal function (blood-urea-nitrogen >30 mgm. percent; creatinine clearance >10 ml./min.) over a 60 day follow up period.

Histopathology

The appearance of untreated rejected dog renal allografts has been well described previously. The grafts in gross appearance are tense and grossly swollen. Interstitial hemorrhages, and microvascular thrombi are usually Bone marrows Bone marrows were examined for evidence of stimulation of myeloid, lymphoid, and erythroid elements. Untreated renal autografts and untreated animals served as comparable controls. These animals, on a scale of 1 to 4+ generally exhibited 1+ stimulation of myeloid, and erythroid elements, and 1+ depletion of lymphoid components. This may be within the error of the technique. Azathioprine treated (5 mgm./kg.) animals exhibited no detectible change in myeloid, or lymphoid elements, but 2+ stimulation of erythroid components. Azathioprine (5 mgm./kg.) and respiration stimulating factor treated animals had 2+ depletion of lymphoid elements, 2+ stimulation of myeloid and 1+ stimulation of erythroid components. Respiration stimulating factor treated animals were not detectibly different from untreated autografts and control animals. In summary, bone marrow appearance in azathioprine and respiration stimulating factor treated groups showed less erythroid stimulation or depletion, and more marked lymphoid depletion.

On the basis of the foregoing Examples X and XI the respiration stimulating factor treatment of itself has no significant effect in prolonging survival in renal allografted mongrel dogs. It is, however, without apparent toxic effect on hematopoietic and renal functional systems. In the presence of azathioprine on a dose related basis, the respiration stimulating factor increases survival and further decreases total lymphocyte counts. This finding in association with the bone marrow depletion of lymphoid elements and evidence of diminished renal histological evidence of rejection, suggests that the respiration stimulating factor augments the immuno-suppressive effects of azathioprine. At the dose of respiration stimulating factor used, this is limited to the 5 mgm./kg. range in azathioprine treated animals. Other serological studies will be necessary to further explain the immunological nature of these findings. The noted additive and protective effect of the respiration stimulating factor in azathioprine treated animals is, however, apparent and fully substantiated.

Conclusions: The respiration stimulating factor, an antioxidant agent, commercially prepared from baker's yeast on a dose related basis (50 mgm./kg./im/Q.O.D.) increases the survival of azathioprine treated (5 mgm./kg./im/q.d.) mongrel dog renal allografts. This effect is associated with significant decrease in total lymphocyte counts, and increased lymphoid depletion apparent in bone marrow aspirates in respiration stimulating factor and azathioprine treated animals. The respiration stimulating factor treatment alone, while increasing postoperative survival to a small degree, is without the other aforementioned effects. The respiration stimulating factor in part protects the bone marrow of azathioprine treated animals from unmonitored toxic effects. Other possible mechanisms of activity are at present unknown.

As stated above, the two essential ingredients, the toxicity control agent or respiration stimulating factor and the drug product produce remarkable and unexpected results over a wide-spectrum of drug products of chemically unrelated characters by a mechanism of action as yet not fully understood.

The six drug examples treated above (reserpine, kanamycin, nitrogen mustard, chlortetracycline, aspirin and azathioprine) are completely unlike chemically as well as in physiological action. Kanamycin and chlortetracycline are both antibiotics, but their toxic manifestations differ markedly. The physiological action of azathioprine is somewhat similar to nitrogen mustard but the mechanism of this action is as yet unknown.

Reserpine is a hypotensive agent. It is a crystalline alkaloid of known structure derived from the root of *Rauwolfia serpentina*. It has also been synthesized.

Kanamycin is an antibiotic of known chemical structure and is produced by *Streptomyces kanamyceticus*. It is composed of two amino sugars (hexosamines) glycosidally linked to deoxystreptamine.

Nitrogen mustard or mustargen (mechlorethamine hydrochloride) chemically is 2,2'-dichloro-N-methyldiethylamine hydrochloride. It is an antineoplastic agent of the polyfunctional alkylating type. It is one of a class of alkylating agents used in the treatment of certain types of cancer. Other drugs in this class include busulfan, chlorambucil, cyclophosphamide, thio-tepa, triethylene melamine and sarcolysin.

Chlortetracycline (aureomycin) is an antibiotic produced by *Streptomyces aurefaciens*. Its chemical structure is known and is very different from kanamycin. The tetracyclines, of which this is an example, are broad-spectrum antibiotics which are bacteriostatic rather than bactericidal.

Aspirin, widely used as an analgesic for the relief of pain, is acetylsalicylic acid. It is classified as a central nervous system drug although its exact mechanism of action is unknown.

Azathioprine (Imuran) chemically is 6-[(1-methyl-4-nitroimidazo-5-yl)thio] purine. It was originally proposed as an antineoplastic agent, but now is used almost exclusively as an immunosuppressive agent to prevent rejection of organ transplants. The exact mechanism of the immunosuppressive activity has not been determined but is known to bring about bone marrow depression with consequent leukopenia including depression of the lymphocyte count.

In view of the chemical and physiological dissimilarity of these drugs, it is quite unexpected that the toxicity of all of them should be diminished by the respiration stimulating factor. This is especially true since there is no apparent connection between its effect on toxicity and the respiration accelerating effect already demonstrated from the respiration stimulating factor.

It will be understood by one skilled in the art that the amount of control agent or respiration stimulating factor to be used with a given drug preparation should be sufficient to bring about the diminuation or amelioration of undesired side effects of that drug preparation. The dosage will depend on a number of variables including the nature of the drug preparation itself, its concentration, and the route of administration and speed of administration of both the drug and the respiration stimulating factor. Another element for consideration is the respiratory activity of the respiration stimulating factor itself. In their present state of purification, commercially available respiration stimulating factors have an activity of about 1000 respiratory units/50 mg. or 20 respiratory units/mg. This activity can vary slightly from batch to batch. In addition, work is continuing toward the further purification of these materials.

From the above, it will be evident that dosages must be determined to a large extent on an individual case basis depending upon the drug used and the ultimate goals sought. Dosage determination may be made in the usual experimental and clinical manner well known to those skilled in the art.

The embodiments of the invention in which an exclusive property or privilege is claimed are defined as follows:

1. In the treatment of an animal organism with a non-topical drug preparation for internal use, chosen from the class consisting of reserpine, kanamycin, mechlorethamine hydrochloride, chlortetracyline, acetylsalicylic acid and azathioprine, the treatment being one for which said non-topical drug preparation is normally used, which comprises a method of reducing the toxicity of said non-topical drug preparation by the steps of introducing said drug into the bloodstream of said organisms, and introducing into said bloodstream a respiration stimulating factor being prepared by extracting with ethyl alcohol a material chosen from the class consisting of yeast, malt combings, spleen and liver, separating solid from liquid, and evaporating the liquid under reduced pressure to remove the alcohol and to concentrate the extract, said respiration stimulating factor being introduced in an amount sufficient to reduce said toxicity.

2. The method claimed in claim 1 wherein said factor is introduced into said bloodstream prior to the introduction of said drug preparation.

3. The method claimed in claim 1 wherein said factor is introduced into said bloodstream subsequent to the introduction of said drug preparation.

4. The method claimed in claim 1 wherein said drug preparation and said factor are mixed and introduced into said bloodstream simultaneously.

References Cited
UNITED STATES PATENTS

| | | | |
|---|---|---|---|
| 2,320,479 | 6/1943 | Sperti | 424—95 |
| 2,239,345 | 4/1941 | Sperti | 424—106 |

SAM ROSEN, Primary Examiner

U.S. Cl. X.R.

424—106, 195, 227, 230